United States Patent [19]

Fujioka

[11] 4,142,614
[45] Mar. 6, 1979

[54] HYDRAULIC TRANSMISSION CONTROL SYSTEM

[75] Inventor: Kazuyoshi Fujioka, Tokyo, Japan

[73] Assignee: Nissan Motor Company, Limited, Japan

[21] Appl. No.: 734,610

[22] Filed: Oct. 21, 1976

[30] Foreign Application Priority Data

Oct. 22, 1975 [JP] Japan ................................. 50-126443

[51] Int. Cl.² .......................... B60K 41/26; F16D 11/06
[52] U.S. Cl. ................................... 192/4 A; 192/3.33; 192/18 A
[58] Field of Search .................... 192/4 A, 4 R, 18 A, 192/3.33

[56] References Cited

U.S. PATENT DOCUMENTS

| 3,042,166 | 7/1962 | Crane | 192/18 A |
|---|---|---|---|
| 3,557,640 | 1/1971 | Hendricks et al. | 192/4 A |
| 3,651,904 | 3/1972 | Snoy et al. | 192/4 A |
| 3,765,520 | 10/1973 | Asand et al. | 192/4 A |
| 3,817,357 | 6/1974 | Mori et al. | 192/3.33 |
| 3,863,523 | 2/1975 | Starling et al. | 192/4 A |

*Primary Examiner*—William F. O'Dea
*Assistant Examiner*—Larry Jones
*Attorney, Agent, or Firm*—Lowe, King, Price & Becker

[57] ABSTRACT

A clutch control valve serves to cut off the supply of hydraulic fluid pressure to a hydraulic operated clutch to render the clutch ineffective in response to the operation of a transmission for obtaining a change of gear ratio and serves similarly also when the brake is applied.

7 Claims, 8 Drawing Figures

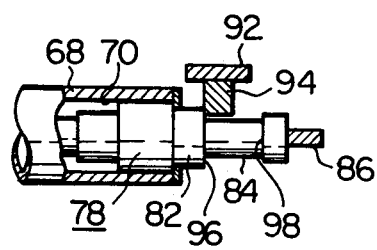
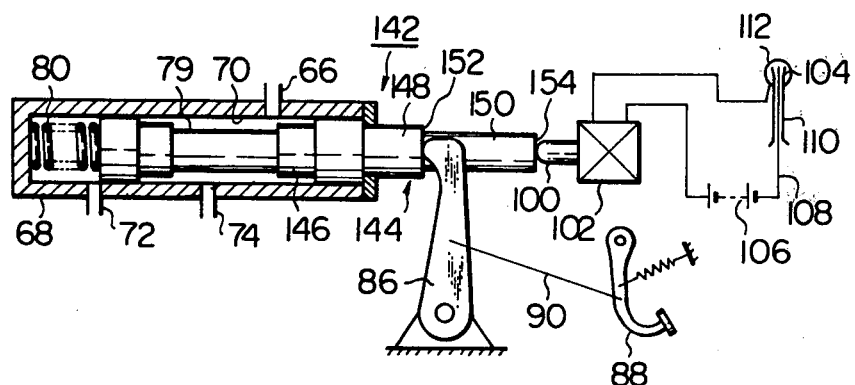
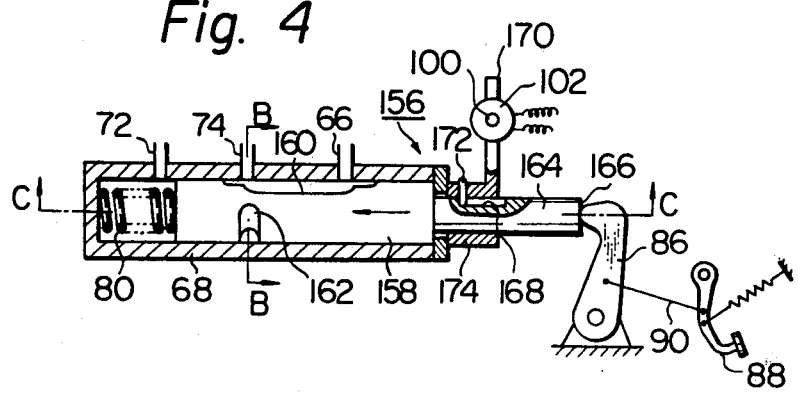

HYDRAULIC TRANSMISSION CONTROL SYSTEM

The present invention relates generally to a hydraulic control system for a transmission for use in an industrial motor vehicle and particularly to a hydraulic control system of this type which is so improved that a change of gear ratio can be effected without bringing the vehicle to a standstill.

As is well known in the art, a transmission for an industrial motor vehicle was required to include hydraulically operated clutches of the same number as that of forward and reverse gears provided by the transmission. For example, a two forward speed and two reverse speed transmission included four hyraulically operated clutches. Thus considerable space was occupied by the hydraulically operated clutches. Accordingly, as the size of the transmission increased it was rendered impossible to make it and the vehicle compact.

Thus, an industrial motor vehicle transmission has been developped which includes only two hydraulically operated clutches for forward and backward travel, respectively and is constructed and arranged to obtain changes of gear ratios by switching over mesh among gear wheels. However, this transmission has suffered from the drawback that it is necessary to bring the vehicle to a halt for obtaining changes of gear ratios.

It is, therefore, an object of the invention to provide a hydraulic control system for an industrial motor vehicle transmission which system is improved to comprise a clutch control valve serving to temporarily stop the supply of hydraulic fluid pressure to a hydraulically operated clutch to disengage the clutch when a change of gear ratio is effected so that the gear ratio change can be effected even when the vehicle is travelling.

This and other objects and advantages of the invention will become more apparent from the following detailed description taken in connection with the accompanying drawings in which:

FIG. 2 is a schematic cross sectional view of a part of the hydraulic control system shown in FIG. 1;

FIG. 3 is a schematic view of an example of a clutch control valve forming a part of the hydraulic control system according to the invention;

FIGS. 4 to 7 are schematic views of a further example of the clutch control valve.

The invention will be described as applied to a transmission providing, for example, two forward speeds and two reverse speeds.

Figure 1:
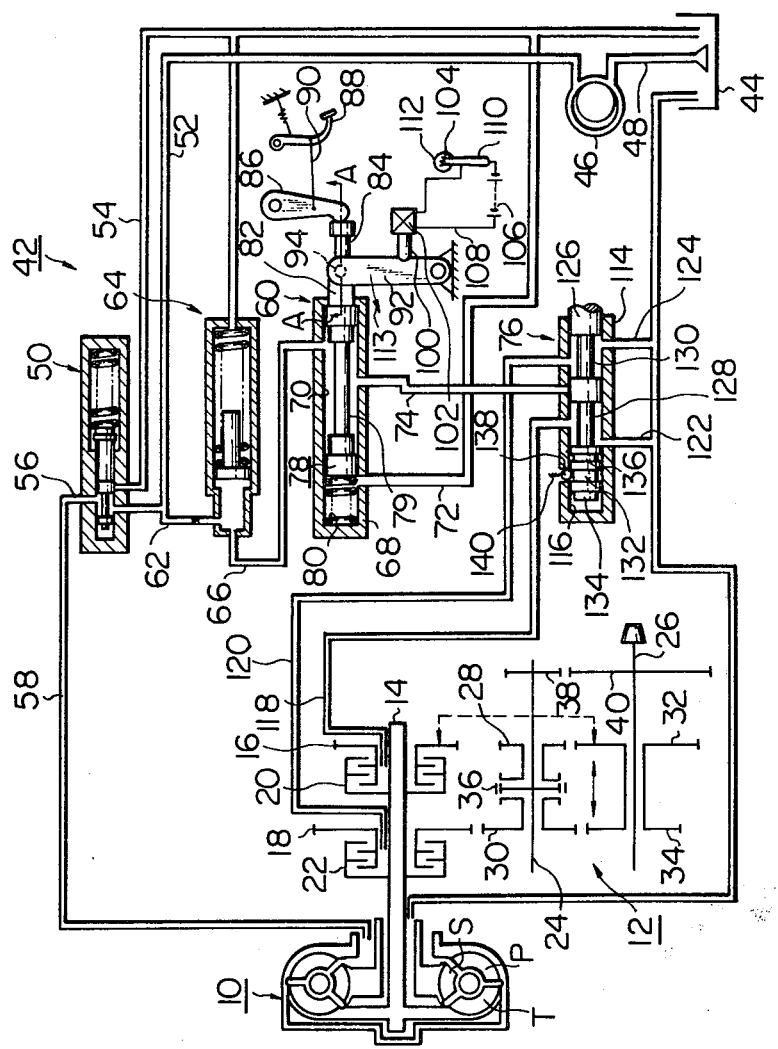
FIG. 1 is a schematic cross sectional view of a preferred embodiment of a hydraulic control system according to the invention.
Figure 5:
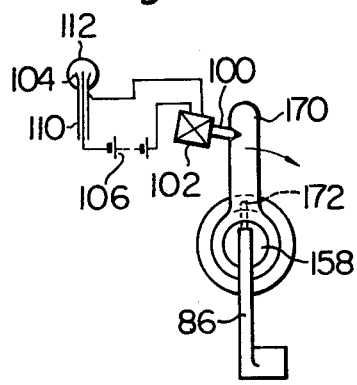

Referring to FIGS. 1 and 2 of the drawings, there is shown a hydraulic torque converter 10 and a transmission 12 for a motor vehicle (not shown) and a hydraulic control system according to the invention which is combined with the torque converter 10 and the transmission 12. The torque converter 10 includes a pump impeller P driven by an engine (not shown) of the vehicle, a stator S, a turbine impeller T hydrokinetically driven from the pump impeller P, and an output shaft 14 fixedly connected to the turbine impeller T. The transmission 12 includes first and second input gear wheels 16 and 18 for forward and reverse drive, respectively which are mounted on and are freely rotatable with respect to the input shaft 14, and first and second hydraulic power clutches 20 and 22 mounted on the input shaft 14. The clutches 20 and 22 are engaged to fixedly connect the input gear wheels 16 and 18 to the input shaft 14 for causing the gear wheels 16 and 18 to be driven thereby and are disengaged to disconnect the gear wheels 16 and 18 from the input shaft 14 for inhibiting the gear wheels 16 and 18 to be driven thereby, respectively. The transmission 12 also includes intermediate and output shafts 24 and 26 located in parallel with the input shaft 14, first and second intermediate gear wheels 28 and 30 mounted on and freely rotatable with respect to the intermediate shaft 24, and first and second idle gear wheels 32 and 34 mounted on and freely rotatable with respect to the output shaft 26 and integrally connected to each other. A coupling 36 is mounted through a spline (not shown) on the intermediate shaft 24 and is axially movable in opposite directions to alternatively fixedly connect the intermediate gear wheels 28 and 30 to the intermediate shaft 24 for causing the gear wheels 28 and 30 to be driven thereby. The input gear wheels 16 and 18 mesh respectively with the idle and intermediate gear wheels 32 and 30 at all times. The intermediate gear wheels 28 and 30 mesh respectively with the idle gear wheels 32 and 34 at all times. Driving and driven gear wheels 38 and 40 are fixedly mounted respectively on the intermediate and output shafts 24 and 26.

The routes of transmission of the engine power in various engaging conditions of the clutches 20 and 22 and the coupling 36 are as follows:

When the clutch 20 is engaged to allow the vehicle to travel forward only, the input gear wheel 16 rotates the idle gear wheels 32 and 34 integrally. In this instance, when the coupling 36 engages the intermediate gear wheel 28, the power is transmitted from the gear wheel 32 to the output shaft 26 by way of the gear wheel 28 and the driving and driven gear wheels 38 and 40 to allow the vehicle to travel forward at a high speed. When the coupling 36 engages the intermediate gear wheel 30, the power is transmitted from the gear wheel 34 to the output shaft 26 by way of the gear wheels 30, 38 and 40 to allow the vehicle to travel forward at a low speed.

When the clutch 22 is engaged to allow the vehicle to travel backward only, the input gear wheel 18 rotates the intermediate gear wheel 30. Accordingly, the gear wheel 30 rotates the idle gear wheels 32 and 34 integrally and the gear wheel 32 rotates the intermediate gear wheel 28. When the coupling 36 engages the gear wheel 28, the power is transmitted to the output shaft 26 by way of the gear wheels 30, 34, 32, 28, 38 and 40 to allow the vehicle to travel backward at a high speed. When the coupling 36 engages the gear wheel 30, the power is transmitted to the output shaft 26 by way of the gear wheels 30, 38 and 40 to allow the vehicle to travel backward at a low speed.

The hydraulic control system, generally designated by the reference numeral 42, comprises a hydraulic fluid tank or sump 44, a pump 46 communicating with the tank 44 through a line or passage 48, and a pressure regulating valve 50 communicating with the pump 46 through a line 52. The pump 46 is driven by, for example, the engine to draw hydraulic fluid from the tank 44 and to discharge pressurized hydraulic fluid into the line 52 as a line or working pressure. The pressure regulating valve 50 communicates the line 52 with a drain line 54 communicating with the tank 44 and regulates the line pressure to a predetermined value. The pressure regulating valve 50 also communicates the line 52 with the torque converter 10 through an orifice 56 and a line 58 and feeds to the torque converter 10 the line pressure the flow of which is throttled by the orifice 56. The line 52 communicates with an inching valve or a clutch control valve 60 through a line 62, a cushion or damping valve 64, and a line 66.

The clutch control valve 60 comprises a housing 68 defining a bore 70 therein. The bore 70 communicates with the line 66 and through a line 72 with the drain line 54 and through a line 74 with a selector valve 76. A valve spool 78 is slidably fitted in the bore 70 and is formed therein with an annular groove 79. The clutch control valve 60 has and is movable between a first position shown in FIG. 1 in which the groove 79 communicates the line 66 with the line 74 and the valve spool 78 separates the line 72 from the line 74 and a second position in which the valve spool 78 separates the line 66 from the line 74 and the groove 79 communicates the line 74 with the line 72. A spring 80 is provided to urge the valve spool 78 into the first position. The valve spool 78 has an extension 82 projecting outside the housing 68 and formed therein with an annular groove 84. An actuating lever 86 is swingably provided to abut at a free end against an end of the extension 82 of the valve spool 78 and is mechanically interlocked with a brake pedal 88 of a braking system of the vehicle through a linkage 90 so that the valve spool 78 is in the first position when the brake pedal 88 is released and is moved into the second position by the lever 86 swinged in opposition to the force of the spring 80 when the brake pedal 88 is depressed for decelerating the vehicle. An actuating lever 92 is swingably provided which has a pin 94 fixedly secured to a free end thereof. The lever 92 is held in a dormant position in which the pin 94 engages a step or shoulder 96 of the groove 84 of the extension 82 which step is adjacent to the housing 18 and remote from the lever 86 as best shown in FIG. 2 of the drawings when the clutch control valve 60 is in the first position shown in FIG. 1. The groove 84 has a length which prevents the other step or shoulder 98 of the groove 84 from striking against the pin 94 when the clutch control valve 60 is moved from the first position into the second position by the depression of the brake pedal 88. An actuating member 100 is provided to abut against a side of the lever 92 for swinging it. A solenoid 102 is provided for operating the actuating member 100 and has a core (not shown) fixedly connected to the actuating member 100. The solenoid 102 is electrically connected at one terminal to a normally open pressure switch 104 and at the other terminal to an electric power source 106 such as a battery to form a solenoid control circuit 108.

A gear shift lever 110 is provided for shifting gear ratios of the transmission 12 and cooperates with the switch 104 to open and close same. A nob 112 may be provided to incorporate therein the switch 104 and is pushed by the operator (not shown) of the vehicle to close the switch 104 when he moves the gear shift lever 110. The gear selector lever 110 is operatively connected to the coupling 36 through a mechanism (not shown) such as, for example, a fork and a link and has and is manually movable among a neutral position shown in FIG. 1 in which the coupling 36 is in a neutral position to engage neither of the intermediate gear wheels 28 and 30 to disconnect both of the gear wheels 28 and 30 from the intermediate shaft 24, a high speed position in which the coupling 36 engages the gear wheel 28 to connect same with the intermediate shaft 24, and a low speed position in which the coupling 36 engages the gear wheel 30 to connect same with the intermediate shaft 24. When the gear selector lever 110 is in the neutral, low speed and high speed positions, the switch 104 is opened to deenergize the solenoid 102 so that the lever 92 is maintained in the dormant position shown in FIGS. 1 and 2. When the gear shift lever 110 is among the neutral and high and low speed positions, the switch 104 is closed to energize the solenoid 102 during manipulation of the gear shift lever 110 to cause the actuating member 100 to swing the lever 92 in the direction of the arrow 113 shown in FIG. 1. As a result, the lever 92 is swinged from the dormant position into an operative position to move the clutch control valve 60 from the first position into the second position.

The selector valve 76 comprises a housing 114 defining a bore 116 therein. The bore 116 communicates with the inlet line 74 and with the clutches 20 and 22 through first and second outlet lines 118 and 120, respectively and with first and second drain lines 122 and 124 communicating with the tank 44. A valve spool 126 is slidably fitted in the bore 116 and is formed therein with first and second annular grooves 128 and 130. The selector valve 76 has and is manually movable among a neutral position shown in FIG. 1 in which the grooves 128 and 130 communicate the outlet lines 118 and 120 with the drain lines 122 and 124, respectively and the valve spool 126 separates the outlet lines 118 and 120 from the inlet line 74, a first position on the right hand of the neutral position in FIG. 1 in which the groove 128 communicates the inlet line 74 with the outlet line 118 and the valve spool 126 separates the outlet line 120 from the inlet line 74, and a second position on the left hand of the neutral position in FIG. 1 in which the groove 130 communicates the inlet line 74 with the outlet line 120 and the valve spool 126 separates the outlet line 118 from the inlet line 74. The valve spool 126 is also formed therein with third, fourth and fifth annular grooves 132, 134 and 136. A ball 138 is located in groove (no numeral) formed through the housing 114 and is urged toward the valve spool 126 by a spring 140. The ball 138 is engaged respectively with the grooves 132, 134 and 136 when the valve spool 126 is in the neutral, first and second positions to position the valve spool 126 therein.

The hydraulic control system 42 thus for described is operated as follows:

When each of the gear shift lever 110 and the selector valve 76 is in the neutral position, the coupling 36 engages neither of the intermediate gear wheels 28 and 30 to disconnect same from the shaft 24 and concurrently the switch 104 is opened to deenergize the solenoid 102. As a result, the clutch control valve 60 is in the first position shown in FIG. 1 to communicate the inlet line 66 with the outlet line 74 to feed the line pressure the shock of which is lightened by the cushion valve 64 to the selector valve 76. But, the selector valve 76 separates the lines 118 and 120 from the line 74 and communicates the lines 118 and 120 with the drain lines 122 and 124, respectively to disengage both the clutches 20 and 22 to inhibit the vehicle to travel forward and backward.

When the selector valve 76 is in one of the forward and reverse travel positions and the gear shift lever 110 is in one of the high and low speed positions, the selector valve 76 communicates the line 74 with one of the lines 118 and 120 so that the line pressure is fed into one of the clutches 20 and 22 to engage the one clutch 20 or 22 to allow the vehicle to travel either forward or backward. On the other hand, the switch 104 is opened to allow the clutch control valve 60 to feed the line pressure to the selector valve 76. Concurrently, the coupling 36 engages one of the intermediate gear wheels 28 and 30 to connect the one gear wheel 29 or 30 to the intermediate shaft 24 to allow the vehicle to travel at an either high or low speed.

In this state, when the gear shift lever 110 is shifted to the other speed position, the switch 104 is temporarily closed to energize the solenoid 102 during shifting movement of the gear shift lever 110 from the one speed position to the other speed position. As a result, the actuating member 100 is moved to swing the lever 92 in the direction of the arrow 113 to move the clutch control valve 60 from the first position into the second position. Accordingly, the clutch control valve 60 separates the outlet line 74 from the inlet line 66 and communicates the outlet line 74 with the drain line 72. Consequently, the one line 118 or 120 communicating with the line 74 through the selector valve 76 is separated from the line 66 and communicates with the drain line 72 to temporarily disengage the one clutch 20 or 22 which is engaged. Thus, it is rendered possible to change the engagement of the coupling 36 from the one gear wheel 28 or 30 to the other gear wheel 30 or 28 to shift the speed of the vehicle from the one speed into the other speed by manipulation of the gear shift lever 110 even when the vehicle is travelling forward or backward. When the gear shift lever 110 reaches the other speed position to complete the gear shift and the operator of the vehicle takes his hand from the gear shift lever 110, the switch 104 is opened to deenergize the solenoid 102. As a result, the actuating member is moved to cause the lever 92 to return to the dormant position shown in FIG. 1. Accordingly, the clutch control valve 60 is caused to move from the second position into the first position to separate the outlet line 74 from the drain line 72 and to communicate the outlet line 74 with the inlet line 66. Consequently, the one line 118 or 120 again communicates with the line 66 to feed the line pressure to the one clutch 20 or 22 to engage same.

When the brake pedal 88 is depressed for decelerating the vehicle, the clutch control valve 60 is moved by the lever 86 from the first position to the second position to separate the inlet line 66 from the outlet line 74 and to communicate the outlet line 74 with the drain line 72. Accordingly, when one of the clutches 20 and 22 is engaged, the corresponding line 118 or 120 communicates with the drain line 72 to temporarily disengage the engaged clutch 20 or 22 to heighten the braking effect.

Referring to FIGS. 3 to 8 of the drawings, there is shown other three examples of a clutch control valve of a hydraulic control system according to the invention. In FIGS. 3 to 8, like component elements and parts are designated by the same reference numerals as those used in FIG. 1. A clutch control valve 142 shown in FIG. 3 is characterized in that the actuating member or rod 100 for actuating the clutch control valve 142 when a gear change is effected directly engages an extension 144 of a valve spool 146 of the clutch control valve 142, in lieu of engaging the actuating member 100 with the actuating lever 92 as in the clutch control valve 60 shown in FIG. 1. In this instance, as shown in FIG. 3 the extension 144 comprises an inner section 148 and an outer section 150 having a diameter or cross sectional area smaller than that of the inner section 148 and has a step or shoulder 152 formed between the inner and outer sections 148 and 150. The actuating member 100 abuts against the outer end 154 of the outer section 150 while the actuating lever 86 engages the shoulder 152 for swinging movement for moving the clutch control valve 142 in response to the depression of the brake pedal 88. The clutch control valve 142 thus constructed is moved from the first position into the second position similarly as described above by the actuating lever 86 swinged during depression of the brake pedal 88 and by the actuating member 100 moved during energization of the solenoid 102 independently of each other and without interfering with each other.

Figure 6:
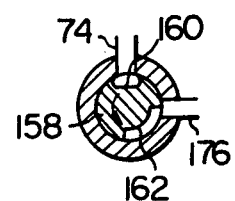
Figure 7:
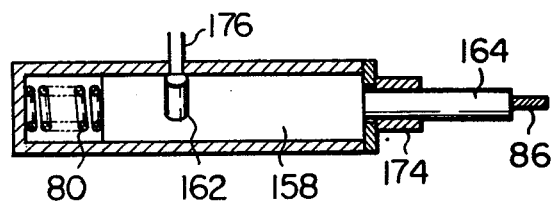

A clutch control valve 156 shown in FIGS. 4 to 7 is characterized in that a valve spool 158 thereof is rotated by the actuating member 100 upon energization of the solenoid 102, in lieu of axially moving the valve spool 78 as in the clutch control valves 60 and 142 shown in FIGS. 1 to 3. In this instance, the valve spool 158 is in the form of a cylinder and is formed in its circumference with an axial groove 160 of a suitable length and an arcuate groove 162 partially extending along the circumference and having a length of a central angle of, for example, 90° and communicating with the outlet line 74. The valve spool 158 has an extension 164 for swinging movement for moving the valve spool 158 in the form of a cylinder. The actuating lever 86 abuts against the outer end 166 of the extension 164. The lines 66, 72 and 74 and the axial groove 160 are arranged with respect to each other in such a manner that when the brake pedal 88 is released, the clutch control valve 156 is in the first position shown in FIG. 4 in which the axial groove 160 communicates the inlet line 66 with the outlet line 74 and the valve spool 158 separates the drain line 72 from the outlet line 74 and when the brake pedal 88 is depressed, the clutch control valve 156 is moved by the actuating lever 86 from the first position into the second position in which the valve spool 158 separates the inlet line 66 from the outlet line 74 and the axial groove 160 communicates the drain line 72 with the outlet line 74. The extension 164 of the valve spool 158 is formed in its circumference with an axial groove 168. An actuating lever 170 is mounted on the extension 164 for swinging movement for rotating the valve spool 158 and so that it is axially slidable with respect to the extension 164. The actuating member 100 abuts against the actuating lever 170 so as to rotate same around the axis of the extension 164 when the solenoid 102 is energized. A pin 172 extends into the axial groove 168 through a boss 174 of the actuating lever 170 so that the valve spool 158 and the extension 164 are rotated a certain amount by and integrally with the actuating lever 170 when the actuating lever 170 is swinged by the actuating member 100. A drain line 176 as shown in FIGS. 6 and 7 is provided which communicates with the bore 70 of the housing 68 of the clutch control valve 156 and with the tank 44. The drain line 176 is arranged with respect to the outlet line 74 and the circular groove 162 in such a manner that the axial groove 160 communicates the inlet line 66 with the outlet line 74 and the drain line 176 is separated from the outlet line 74 by the valve spool 158 when the actuating lever 170 is not rotated by the actuating member 100 so that the valve spool 158 is in the first position, and that the valve spool 158 separates the inlet line 66 from the outlet line 74 and the circular groove 162 communicates the outlet line 74 with the drain line 176 when the actuating lever 170 is rotated by the actuating member 100 so that the valve spool 158 is moved from the first position into a third position. The pin 172 is, when the brake pedal 88 is released, located at an inner end of the axial groove 168 as shown in FIG. 4 and the axial groove 168 has a suitable length so that the valve spool 158 and the extension 164 can be axially moved relatively with respect to the actuating lever 170 from the first position into the second position by the actuating lever 86 when the brake pedal 88 is depressed. Thus, the actuating lever 86 moves the clutch control valve 156 from the first position into the second position when the brake pedal 88 is depressed and the actuating lever 170 rotates the clutch control valve 156 from the first position into the third position when a gear change is effected without interfering with each other so that the outlet line 74 communicates with the drain line 72 or 176 to disengage the engaged clutch 20 or 22.

Figure 8:
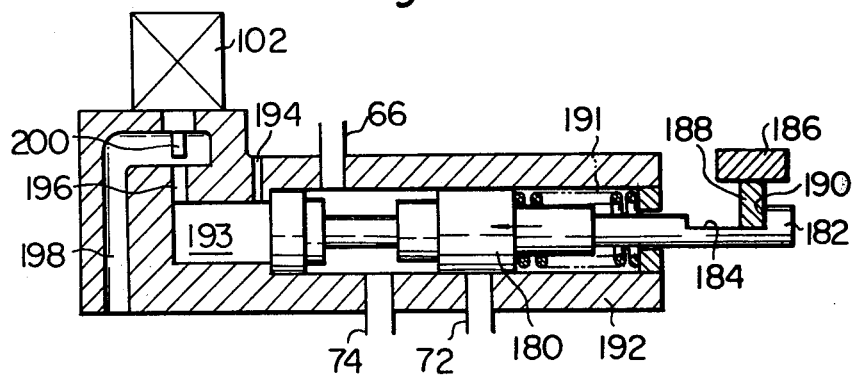
FIG. 8 is a schematic view of a still further example of the clutch control valve.

A clutch control valve shown in FIG. 8 is characterized in that it is actuated by a hydraulic fluid pressure when a gear change is effected in lieu of the actuating member 100 as in the clutch control valves 60, 142 and 156 shown in FIGS. 1 to 7. In this instance, a valve spool 180 of the clutch control valve has an extension 182 formed therein with an axial groove 184. A lever 186 like the actuating levers 86 shown in FIGS. 1, 3 and 4 has at its free end a pin 188 engaging an outer shoulder 190 of the axial groove 184 for swinging movement for operating the valve spool 180. The actuating lever 186 is so swung by the brake pedal 88 that the clutch control valve is moved by the pin 188 in opposition to the force of a spring 191, from the first position to communicate the inlet line 66 with the outlet line 74 into the second position to communicate the outlet line 74 with the drain line 72 to disengage the engaged clutch 20 or 22 when the brake pedal 88 is depressed. A housing 192 is formed therein with a chamber 193 which is merged into the bore 70 and which is connected to or contacts with an end of the valve spool 180. The chamber 193 has an inlet port 194 communicating with, for example, the line 52 for feeding the line pressure into the chamber 193 and an outlet port 196 communicating with the tank 44 through a drain line 198. A control valve 200 is provided which is operable to close and open the outlet port 196 and is operated by the solenoid 102. The solenoid 102 causes the control valve 200 to normally open the outlet port 196 so that the clutch control valve is in the first position and to close the outlet port 196 so that the control pressure acts on the valve spool 180 to move it in opposition to the force of the spring 191 from the first position into the second position similarly to the actuating lever 186 when a gear change is effected to close the switch 104. The axial groove 184 has so a sufficient length that the valve spool 180 is prevented from striking against the pin 188 when moved by the control pressure.

Although the invention has been described as being applied to a transmission including two hyraulically operated clutches and providing two forward speeds and two reverse speeds, the invention can be applied to a transmission including two hydraulically operated clutches and providing three or more forward speeds and three or more reverse speeds. The invention can be also applied to a transmission including one hydraulically operated clutch and a switching-over coupling for shifting gears to provide the vehicle with forward and reverse motions and provide two or more forward speeds and one or more reverse gears.

It will be appreciated that the invention provides a hydraulic control system for a motor vehicle transmission comprising a clutch control valve which serves to cut off the supply of hydraulic fluid pressure to a hydraulically operated clutch to temporarily render the clutch ineffective in response to the operation of the transmission for obtaining a change of gear ratio and serves similarly also when the brake is applied to the vehicle so that the change of gear ratio can be obtained even when the vehicle is travelling by a simple provision and without bringing the vehicle to a standstill.

What is claimed is:

1. A hydraulic control system in combination with a motor vehicle including a braking system and a transmission including a hydraulically operated clutch, said hydraulic control system comprising
    means for producing a pressurized working fluid; the clutch having
    means receiving said working fluid;
    means defining a passage for supplying said working fluid to said clutch;
    a clutch control valve disposed in said passage for controlling supply of said working fluid to said fluid receiving means, said clutch control valve normally assuming a position in which it enables said supply for thereby effecting engagement of the clutch;
    first operating means for moving, in response to gear change in the transmission, said clutch control valve into another position in which said clutch control valve inhibits said supply for thereby effecting disengagement of the clutch, said first operating means being connected to a first portion of said clutch control valve; and
    second operating means for moving, in response to application of the brake in the braking system, said clutch control valve into the last named position in which said clutch control valve inhibits said supply for thereby effecting disengagement of the clutch, said second operating means engaging a second portion of said clutch control valve, said second portion being different from said first portion.

2. A hydraulic control system as claimed in claim 1, in which said first and second operating means are independent of each other and said first operating means comprises
    first sensing means for sensing said gear change, and
    means connected to said first portion and to said first sensing means for moving said clutch control valve into said position to inhibit said supply in response to said gear change sensed by said first sensing means, and said second operating means comprises
    second sensing means for sensing said application of the brake, and
    means engaged with said second portion and connected to said second sensing means for moving said clutch control valve into said position to inhibit said supply in response to said application of the brake sensed by said second sensing means.

3. A hydraulic control system as claimed in claim 1, in which said clutch control valve comprises a valve spool having a second position in which said spool inhibits said supply and effects communication between said fluid receiving means and a drain line, and an extension having first and second sections forming a step therebetween, said first operating means comprises sensing means for sensing operation for shifting a gear ratio in the transmission for producing an output signal, a first operating lever having a free end engaging said step for swinging movement for moving said valve spool into said second position, an operating member engaging a side of said first operating lever for swinging it, and a solenoid for operating said operating member for causing said first operating lever to move said valve spool into said second position in response to said output signal, and said second operating means comprises a second operating lever having a free end engaging an outer end of said extension for swinging movement for moving said valve spool into said second position, and a mechanical linkage for operatively connecting said second operating lever to a brake pedal of said braking system for causing said second operating lever to move said valve spool into said second position in response to the application of the brake in said braking system.

4. A hydraulic control system as claimed in claim 1, in which said clutch control valve comprises a valve spool having a second position in which said spool inhibits said supply and effects communication between said fluid receiving means and a drain line and an extension having an inner section and an outer section having a cross sectional area smaller than that of said inner section, said first operating means comprises sensing means for sensing operation for shifting a gear ratio in the transmission for producing an output signal, an operating member engaging an outer end of said outer section of said extension for moving said valve spool into said second position, and a solenoid for operating said operating member for moving said valve spool into said second position in response to said output signal, and said second operating means comprises an operating lever having a free end engaging a step between said outer and inner sections for swinging movement for moving said valve spool into said second position, and a mechanical linkage for operatively connecting said operating lever to a brake pedal of said brake system for causing said operating lever to move said valve spool into said second position in response to the application of the brake in said braking system.

5. A hydraulic control system as claimed in claim 1, in which said clutch control valve comprises a valve spool which is formed therein with an axial groove and an arcuate groove extending in the direction of its circumference with a suitable central angle and has an extension, said valve spool having a second position in which said spool inhibits said supply and said axial groove effects communication between said fluid receiving means and a drain line and a third position in which said valve spool inhibits said supply and said arcuate groove effects communication between said fluid receiving means and said drain line, said first operating means comprises sensing means for sensing operation for shifting a gear ratio in the transmission for producing an output signal, a first operating lever mounted on said extension for swinging movement for rotating said valve spool into said third position, means for allowing relative axial movement of said valve spool into said second position with respect to said first operating lever, an operating member engaging a side of said first operating lever for swinging it, and a solenoid for operating said operating member for causing said first operating lever to rotate said valve spool into said third position in response to said output signal, and said second operating means comprises a second operating lever which has a free end engaging an outer end of said extension for swinging movement for axially moving said valve spool into said second position, and a mechanical linkage for operatively connecting said second operating lever to a brake pedal of said braking system for causing said second operating lever to axially move said valve spool into said second position in response to the application of the brake in said braking system.

6. A hydraulic control system as claimed in claim 1, in which said clutch control valve comprises a valve spool having a second position in which said spool inhibits said supply and effects communication between said fluid receiving means and a drain line and an extension formed therein with an axial groove, said first operating means comprises means defining a chamber connected to an end of said valve spool opposite to said extension and fed with pressurized hydraulic fluid and having a drain port, sensing means for sensing operation for shifting a gear ratio in the transmission for producing an output signal, a control valve for normally opening said drain port and for closing said drain port for causing said pressurized hydraulic fluid to move said valve spool into said second position, and a solenoid for causing the last-mentioned control valve to close said drain port in response to said output signal, and said second operating means comprises an operating lever which has a free end engaging an outer shoulder of said axial groove of said extension for swinging movement for moving said valve spool into said second position, and a mechanical linkage for operatively connecting said operating lever to a brake pedal of said braking system for causing said operating lever to move said valve spool into said second position in response to the application of the brake in said braking system.

7. A hydraulic control system as claimed in claim 1, in which said transmission further includes a second hydraulically operated clutch, the first-mentioned and said second clutches providing said vehicle with forward and reverse motions, respectively, and said hydraulic control system further comprises a selector valve disposed in said passage between said clutch control valve and said clutches for alternatively providing communication between said clutch control valve and said first mentioned clutch and between said clutch control valve and said second clutch.

* * * * *